Figure 1:
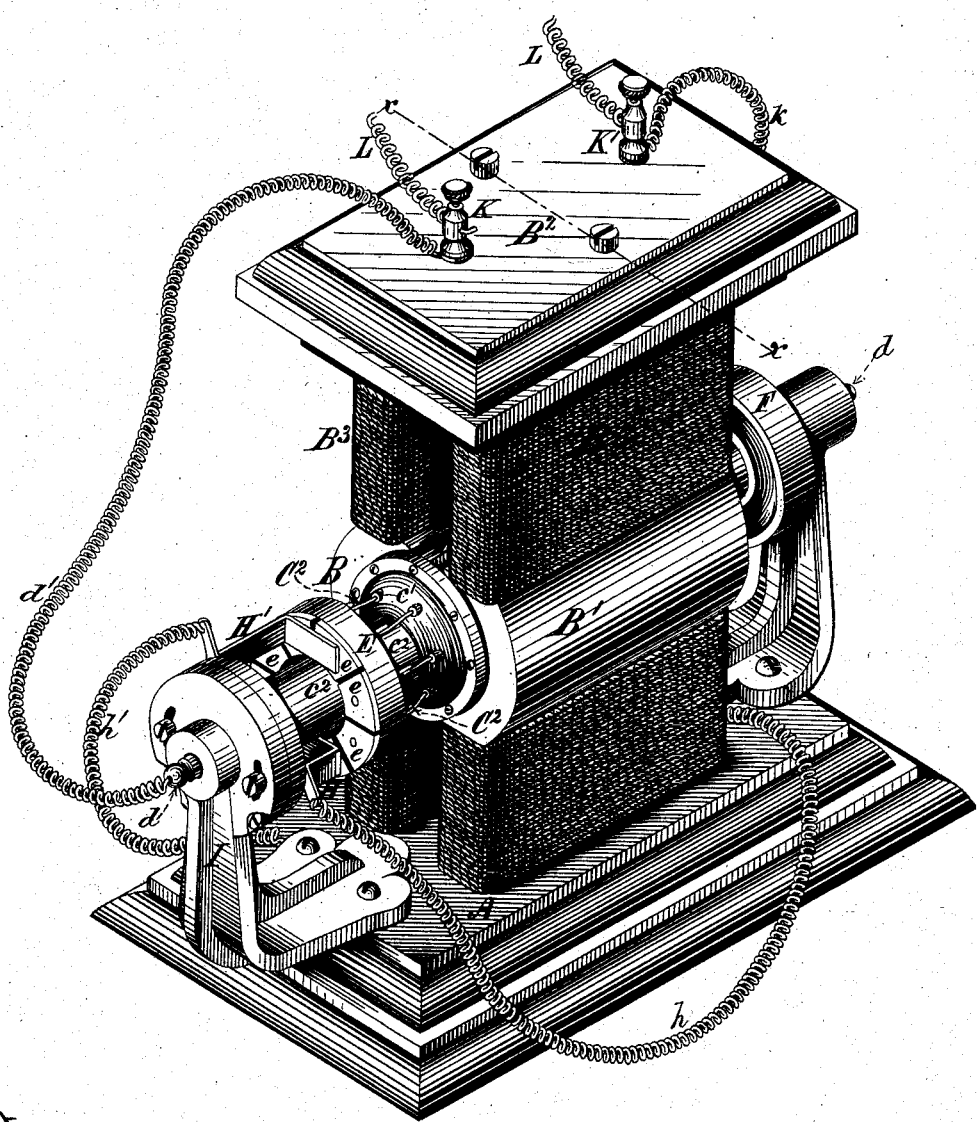

4 Sheets—Sheet 1.

E. WESTON.
Dynamo Electric Machine.

No. 209,094. Patented Oct. 15, 1878.

Witnesses.
Geo. H. Miatt
Edwd Payson

Inventor:
Edward Weston
Per Edw E. Quimby
Atty.

4 Sheets—Sheet 2.

E. WESTON.
Dynamo Electric Machine.

No. 209,094. Patented Oct. 15, 1878.

4 Sheets—Sheet 3.
E. WESTON.
Dynamo Electric Machine.
No. 209,094. Patented Oct. 15, 1878.
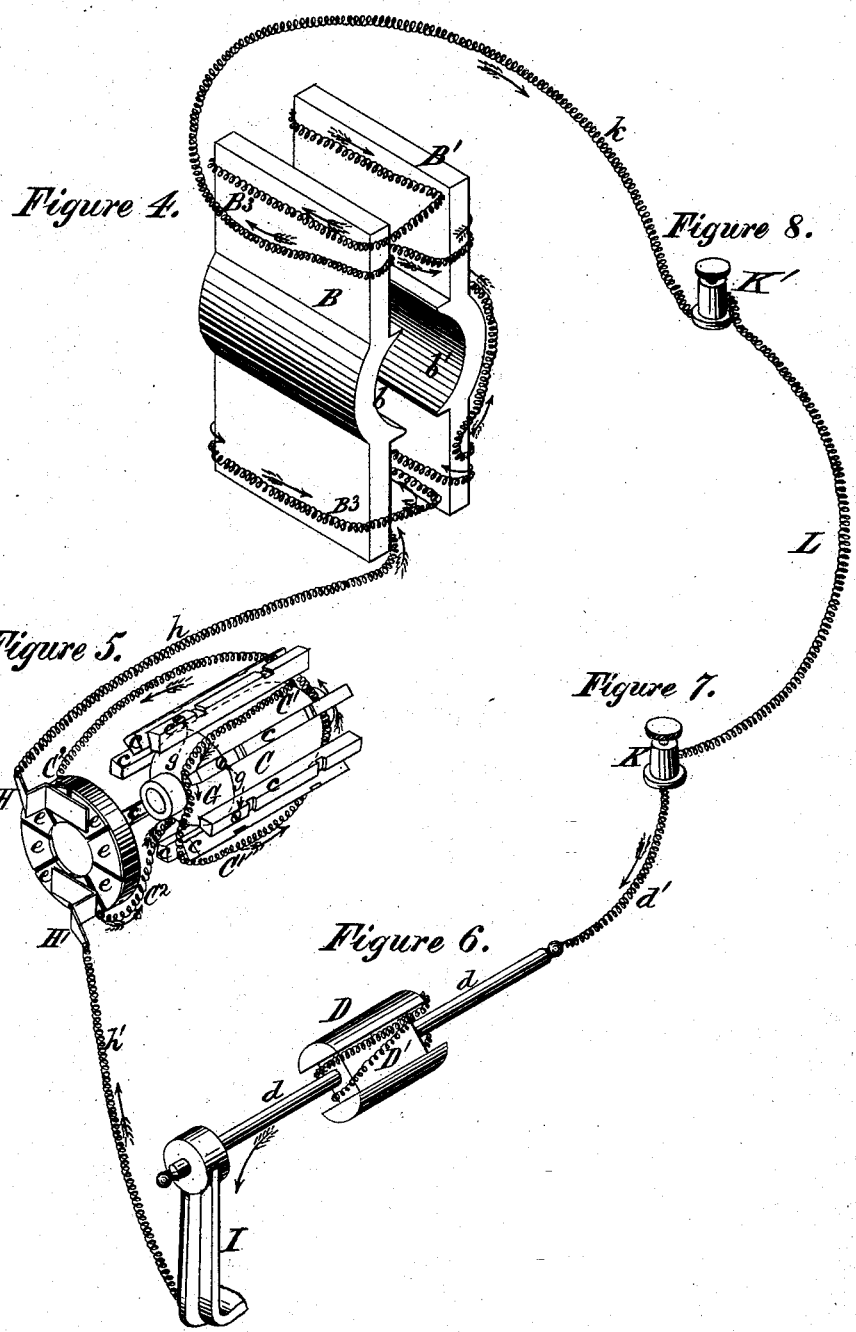
Witnesses:
Geo. H. Miatt
Edw'd Payson
Inventor:
Edward Weston
Per Edw. E. Quimby
Atty E. WESTON.
Dynamo Electric Machine.
No. 209,094. Patented Oct. 15, 1878.
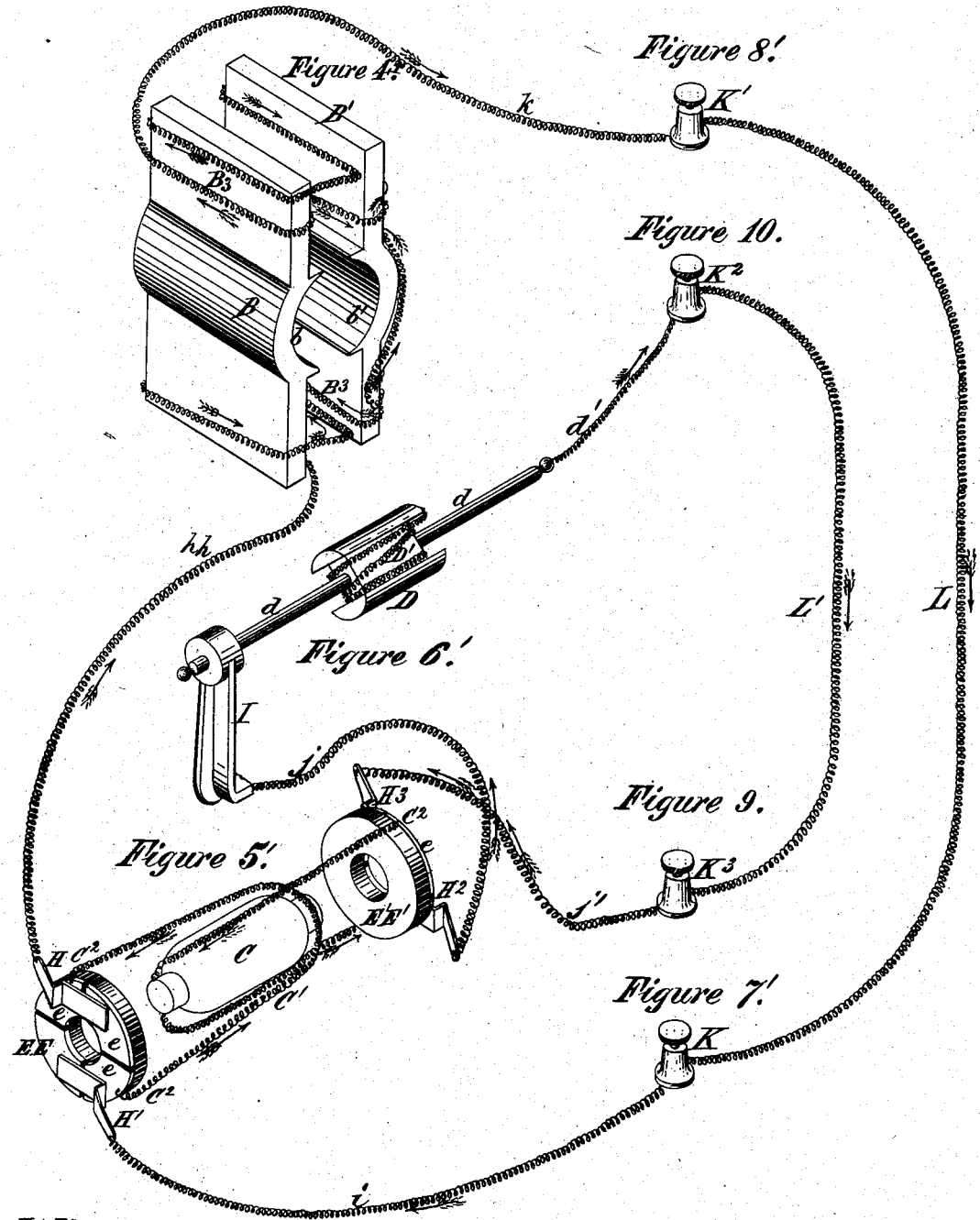

UNITED STATES PATENT OFFICE.

EDWARD WESTON, OF NEWARK, NEW JERSEY, ASSIGNOR TO WESTON DYNAMO ELECTRIC MACHINE COMPANY, OF SAME PLACE.

IMPROVEMENT IN DYNAMO-ELECTRIC MACHINES.

Specification forming part of Letters Patent No. 209,094, dated October 15, 1878; application filed December 31, 1877.

CASE A.

*To all whom it may concern:*

Be it known that I, EDWARD WESTON, of Newark, New Jersey, have invented certain Improvements in Dynamo-Electric Machines, of which the following is a specification:

It is the object of my improvements to lessen the power required to drive a dynamo-electric machine, to diminish the tendency of the machine to become overheated when in operation, and to impart to it the capacity of persistently maintaining a current of electricity of substantially uniform electro-motive force.

One of the distinguishing features of my invention consists in the presence of a stationary electro-magnet within the interior of a rotating coil or coils.

Another feature of my invention consists in the use, as a carrier for the rotating coils in a dynamo-electric machine, of a hollow cylinder or annulus composed of paper or some other non-conducting substance, or some diamagnetic material.

As I have devised a number of modifications in the organization of dynamo-electric machines which severally involve the employment of one or the other, or both, of the features referred to, and which I am about to make the subjects of separate applications for patents, I designate the present application as Case A.

In the present case my improvements are embodied in a machine containing the non-conducting or diamagnetic carrier for the rotating coils, the stationary electro-magnet within the rotating coils, and also stationary electro-magnets outside the rotating coils. Instead of only one electro-magnet inside the rotating coils, there may be two, or even more, with their poles projecting radially from the shaft or bar on which they are supported. In this case there should be a corresponding increase in the number of magnetic poles outside the rotating coils, so that each magnetic field through which a coil is rotated may have a magnetic pole on the outside of the coil of opposite polarity to another magnetic pole on the inside of the coil.

One of my methods of arranging the machine-circuit consists in the inclusion in a single circuit of the coils surrounding all the stationary electro-magnets, and successively, of the coils surrounding the rotating carrier, or, as it may be called, " shell."

There are various modes of winding and connecting the coils upon the rotating shell; but this part of my invention consists in maintaining, in connection with the circuit, two or more rotating coils, in which currents are being simultaneously induced.

My invention also includes a commutator composed of a group of metallic sectors, insulated from each other and mounted radially upon the face of a revolving disk, and hence made to rotate in the same plane, and present a flat surface for contact with the brushes which collect the currents from the commutator.

I connect the opposite ends of each rotating coil respectively with two sectors upon diametrically opposite sides of the axis of the commutator, the ends of adjoining coils being connected with respectively adjoining sectors. Thus the adjoining sectors in one half of the commutator are always of one polarity, and are always of opposite polarity to that of the adjoining sectors in the other half of the commutator. I provide brushes, each of such area as to overlap two or more adjoining sectors, and so arrange them that they respectively overlap sectors of opposite polarities. The result of this organization is, that there is never any interruption of electrical continuity between the brushes and two or more rotating coils in which currents are being simultaneously induced.

As each coil departs from the magnetic field, and the momentary current or impulse induced in it diminishes in strength, the next following coil enters the magnetic field, and its current increases in strength. Hence the decrement in the strength of the current communicated to the brushes from one sector is compensated for by the increment in strength of the current communicated to the brushes from the next following sector; and therefore the current conducted into the operative circuit by the brushes is not only continuous, but is substantially uniform in electro-motive force.

I am not limited to a single circuit in the machine, as by employing two commutators I may connect one portion of the rotating coils with the interior electro-magnet, and the other portion with the exterior electro-magnets. By a parity of arrangement the currents collected from the commutators and conducted respectively into two outside circuits are also continuous, and of nearly constant electro-motive force. The two currents thus obtained may be united in a single operative circuit by means of switches or keys, or they may be maintained in two separate operative circuits. The machine when thus organized may be employed in that system of multiplex telegraphic signaling in which one receiving-instrument is operated by changes in the strength of the current irrespective of its polarity, and another receiving-instrument is operated by changes in the polarity of the current irrespective of its strength.

Figure 3:
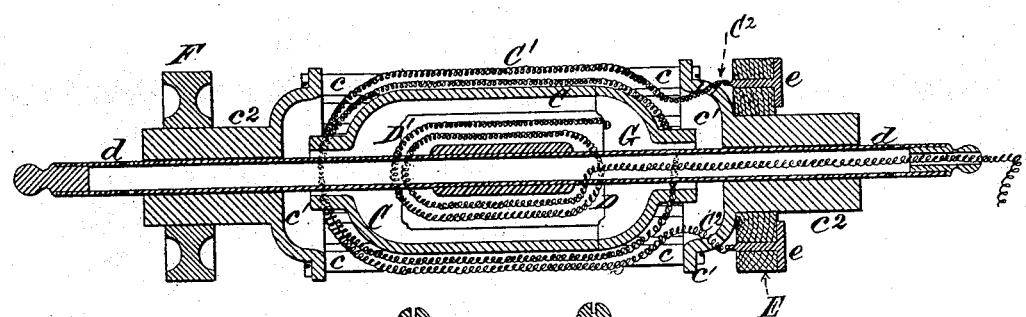
Figure 2:
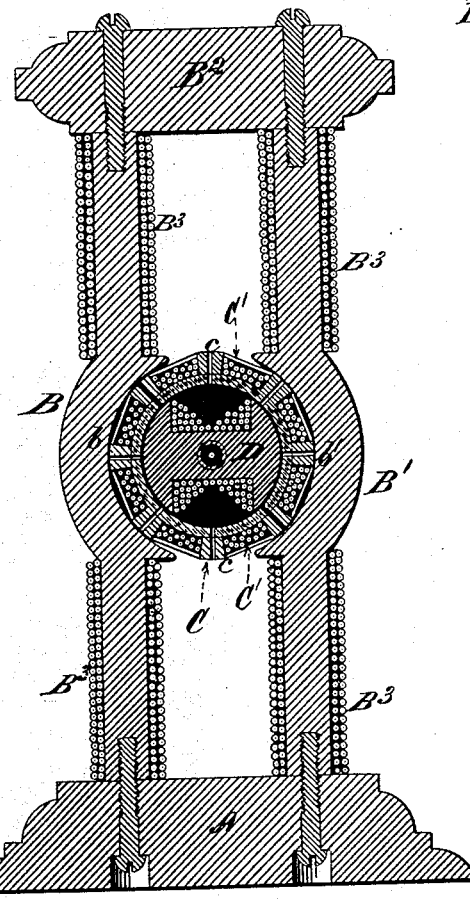

The accompanying drawings are as follows: Figure 1 is an isometrical perspective view of the machine. Fig. 2 is a transverse vertical section through the line $x$ $x$ on Fig. 1. Fig. 3 is a central longitudinal section of a rotating shell, the commutator, the interior stationary magnet, and the bar upon which the interior stationary magnet is supported, and upon which the rotating shell and commutator revolve, showing the mode of winding each system of coils upon the shell, and of connecting such coils with the sectors of the commutator, and also the mode of winding and connecting the coil of the interior stationary electro-magnet. Fig. 4 is an isometrical perspective of the exterior stationary electro-magnets, with the cap, base, and rotating parts of the machine removed for the purpose of showing the mode of winding the coils on the stationary magnets and connecting them with the other parts of the machine. Fig. 5 is an isometrical view of the rotating shell and commutator, showing but one of the systems of coils on the shell. Fig. 6 is an isometrical view of the interior stationary magnet and its supporting-bar and one of the standards which supports the bar. Figs. 7 and 8 are the two binding-posts of the machine.

Figs. 4, 5, 6, 7, and 8 are grouped upon Sheet No. 3, and are connected together by spiral lines, showing the method in which these several parts of the machine are included in the same circuit. A system of arrows shows the path of the current through the entire circuit in one direction.

Sheet No. 4, which contains a group of figures similar to those on Sheet No. 3, respectively marked $4'$, $5'$, $6'$, $7'$, and $8'$, and Figs. 9 and 10, shows the rotating shell provided with two commutators, Fig. $5'$, and also shows the method of connection by which two distinct circuits are obtained, Figs. 9 and 10 being the two additional binding-posts required for the second circuit.

My machine has a substantial bed-plate, A, to which are secured the two vertical cores of the stationary electro-magnets B B$^1$. The upper ends of these cores are bolted to the cross-piece B$^2$, and the coils B$^3$ are so wound upon the vertical cores that the laterally-projecting poles $b$ and $b'$ are of opposite polarities. The faces of the poles $b$ $b'$ are concave and just clear the periphery of the revolving shell C, which is provided with a series of equidistant ribs, $c$, parallel with its axis and projecting from its ends, and by means of which it is secured to the peripheries of two cup-shaped disks, $c^1$. These disks are each provided with long hubs $c^2$, which are perforated to admit the axis or central bar, $d$, upon which they revolve, and by which the electro-magnet D is supported within the interior of the shell. The commutator-disk E is affixed to one of these hubs, and the driving-pulley F is affixed to the other. The shell C is an elongated sphere, and is provided at one end with a removable cap, G, which is held in place by the screws $g$, radially inserted through the ribs $c$.

It will be seen that the ribs $c$ are eight in number. Four distinct and similar systems of coils, C$^1$, are wound lengthwise around the shell in the spaces between the ribs. Two convolutions of one of these systems of coils are shown in Fig. 3. The ends C$^2$ of each of the coils C$^1$ are connected, respectively, with two diametrically-opposite divisions or sectors, $e$, of the commutator. Holes are bored through the outer faces of the ribs $c$, to allow the air from the interior of the shell to escape when the shell is rapidly rotated. The ends of the shell are perforated to admit air into its interior, and hence when the shell is rotated a rapid circulation of air is kept up, which tends to cool the structure. This mode of obtaining a circulation of air through the rotating shell is not a part of the invention herein, but will form the subject of claim in one of my other applications.

My commutator is composed of a number of metallic sectors, $e$, equal to twice the number of coils upon the shell, such sectors being insulated from each other, and affixed to the flat face of the disk E, fastened to one of the rotating hubs $c^2$.

Each pair of diametrically-opposite sectors is connected with the opposite ends of one of the systems of coils upon the shell.

As the neutral points in the magnetic field are vertically opposite each other in the center of the machine, all the adjoining sectors on either side of the commutator are of like polarity, and of opposite polarity to the adjoining sectors on the other side of the commutator.

The currents induced in the rotating coils are collected from the commutator by the brushes H and H$^1$, each of which it will be seen overlaps two or more sectors of like polarity.

The brush H is electrically connected, by means of the wire $h$, with one end of the wire which forms the coils B$^3$ upon the exterior stationary magnets. The other brush, H$^1$, is electrically connected, by means of the wire $h'$, to the standard I, in the upper end of which one end of the bar $d$ is supported.

One end of the coil $D'$ on the stationary magnet D is connected with the iron core of the magnet D, and hence with the supporting-bar $d$, and the other end of the coil is carried out through the interior of the bar $d$, which is made hollow for the purpose, and is connected by means of the wire $d'$ with the binding-post K. One end of the operative circuit L is connected with the binding-post K, and the other end with the binding-post $K^1$, the latter being connected, by means of the wire $k$, with the end of the coil $B^3$ on the stationary magnets opposite to the end which is connected by the wire $h$ to the brush H.

The complete circuit is shown on Sheet No. 3, whereon the several parts of the machine are shown detached from each other.

Referring to Sheet No. 4, it will be seen that Fig. 5' represents a rotating shell provided with two commutators, E E and E' E', each composed of four sectors, connected, respectively, with the ends of two of the four coils upon the rotating shell.

To prevent obscurity, Fig. 5' shows but two of the four coils on the rotating shell.

The coils $B^3$ are in this case connected by the wire $k$ with the binding-post $K^1$, and by the wire $h\ h$ with the brush H, and the brush $H^1$ is connected by the wire $i$ with the binding-post K, the binding-posts K and $K^1$ being connected by the operative part L of their circuit.

The brush $H^2$ of the other commutator is connected by the wire $j$ with the standard I, Fig. 6', and hence with one end of the coil $D'$ on the stationary magnet D, while the other end of the coil $D'$ is connected by the wire $d'$ with the binding-post $K^2$, the latter being connected by the operative part $L'$ of its circuit with the binding-post $K^3$, with which the commutator-brush $H^3$ is connected by the wire $j'$.

The mode of operation of the parts in the arrangement shown in Sheet No. 4 is similar to that already described with reference to the arrangement shown on Sheet No. 3 in respect of the constant electrical contact of all the brushes with sectors of the commutators, by which both currents are made persistent and of substantially uniform electro-motive force.

It will, of course, be understood that I may increase the number of coils upon the rotating shell, as it may be desirable to do in the case of a large machine. If so increased, the number of sectors in the commutator or commutators should be correspondingly increased—that is, there should be twice as many sectors as there may be separate coils upon the rotating shell.

Ordinarily the armatures in a dynamo-electric machine are rotating coils wound upon an iron core or cores, and in operation such cores become polarized, and are strongly attracted by the poles of the stationary electro-magnets in proximity to which they are moved. This attraction acts as a resistance to the movement of the armature, which adds materially to the power required to rotate it.

In my machine the rotating coils have no iron core, being wound upon a carrier composed of a diamagnetic material, preferably of paper, or some other material which, in addition to being diamagnetic, is a non-conductor.

In my machine, therefore, that element of resistance which consists in the attraction of rotating armature-poles by poles of stationary magnets is eliminated, and hence very much less power is required to rotate the coils in my machine; or, in other words, with a given amount of power the coils in my machine may be rotated with much greater rapidity than the coils of an ordinary machine.

As the available current generated by the machine is made up of the impulses or currents induced in the rotating coils successively, it follows that the effectiveness of my machine, in respect of the quantity of electricity it produces with the expenditure of a given amount of power, is greatly increased.

It will, of course, be understood that my rotating shell may be constructed in a variety of ways. For example, the spherical or cylindrical part of the carrier may be made of paper, and may be riveted or otherwise secured to ribs made of metal.

The advantage of making the shell of a non-conducting substance is, that there is then no opportunity for the establishment by induction of rotating currents in the shell. Such currents, when they exist, add resistance to the movement of the coils, and there is therefore an important advantage in making the carrier upon which the rotating coils are wound of a non-conducting material.

The object of this part of my invention is to lessen the resistance to the rotation of the coils. That resistance is lessened when the carrier upon which the coils are wound is composed of a diamagnetic metal, and it is still further lessened when the carrier is composed of a non-conducting material. This part of my invention, therefore, is present when the shell is composed either of a non-conducting substance or of a conducting substance which is diamagnetic, the difference in the two cases being merely, for the purposes of my present invention, a difference in degree.

I therefore claim as my invention, in a dynamo-electric machine—

1. A continuously-revolving coil or coils traversing the exterior of a hollow carrier or shell composed of a non-conducting or diamagnetic material, in combination with an electro-magnet supported within the interior of such revolving shell, substantially as described.

2. A continuously-revolving coil or coils traversing the exterior of a hollow carrier or shell composed of a non-conducting or diamagnetic material, in combination with the poles of one or more stationary electro-magnets supported outside the revolving shell, substantially as described.

3. A continuously-revolving coil or coils traversing the exterior of a hollow carrier or shell composed of a non-conducting or diamagnetic material, in combination with the poles of one or more electro-magnets supported outside the coil, and one or more electro-magnets supported within the interior of the shell upon which the coil or coils are wound, substantially as described.

4. In a dynamo-electric machine, a revolving coil, in combination with a stationary electro-magnet outside of such coil, and a stationary electro-magnet supported within the convolutions of such coil, substantially as and for the purpose set forth.

5. A group of coils wound in radially separate systems upon a shell, substantially such as described, rotating around an electro-magnet supported within the shell, and between the poles of electro-magnets arranged outside of the shell, in combination with a commutator the diametrically-opposite strips of which are respectively connected with the opposite ends of the wire composing one of the group of coils upon the rotating shell, whereby the adjoining strips or sectors on either side of a line bisecting the axis of the commutator are of like polarity, and are of opposite polarity to that of the adjoining strips or sectors of the commutator on the opposite side of the said line, in combination with brushes respectively forming an electrical contact with oppositely-polarized strips or sectors of the commutator, each of which brushes constantly maintains contact with two or more adjoining strips or sectors of the commutator of like polarity, substantially as described.

6. In a dynamo-electric machine, substantially such as described, provided with rotating coils traversing the exterior of a shell inclosing an electro-magnet, an electric circuit embracing the coils around one or more of the electro-magnets, and one or more of the coils surrounding the rotating shell, a commutator, brushes, and an external conductor electrically connecting the binding-posts, substantially as described.

7. A commutator composed of a group of metallic sectors, insulated from each other, and mounted radially upon the face of a rotating disk, in combination with two or more brushes, each of which overlaps two or more adjoining sectors of the commutator, substantially as described.

8. In a dynamo-electric machine, substantially such as described, provided with rotating coils traversing the exterior of a shell inclosing an electro-magnet, two distinct operative circuits, each of which includes a portion of the rotating coils, and one or more coils surrounding one or more stationary electro-magnets, substantially as shown and described.

EDWARD WESTON.

Witnesses:
EDWD. PAYSON,
GEO. W. MIATT.